United States Patent [19]
Engel et al.

[11] 3,923,383
[45] Dec. 2, 1975

[54] FLUID-COOLED LASER MIRROR

[75] Inventors: Simon L. Engel, Mountain View, Calif.; Robert A. McFall, East Peoria, Ill.

[73] Assignee: Caterpillar Tractor Co., Peoria, Ill.

[22] Filed: June 12, 1974

[21] Appl. No.: 478,540

[52] U.S. Cl. .................. 350/310; 350/288; 165/170
[51] Int. Cl.² ........................ G02B 5/08; F28F 3/14
[58] Field of Search .............. 350/288, 310, 63, 61; 331/94.5 C, 94.5 O; 165/170, 162–169; 137/340; 122/406 B, 406 S

[56] References Cited
UNITED STATES PATENTS
| | | | |
|---|---|---|---|
| 1,084,562 | 1/1914 | Roth | 165/170 |
| 3,731,992 | 5/1973 | Mansell | 350/288 |

FOREIGN PATENTS OR APPLICATIONS
| | | | |
|---|---|---|---|
| 309,236 | 4/1929 | United Kingdom | 350/310 |

*Primary Examiner*—Edward S. Bauer
*Assistant Examiner*—Jon W. Henry
*Attorney, Agent, or Firm*—Phillips, Moore, Weissenberger Lempio & Strabala

[57] ABSTRACT

A fluid-cooled laser mirror includes a body defining an internal chamber, fluid inlet port means adjacent the center of the body, and fluid outlet port means adjacent the peripheral edge of the body. A plurality of radially positioned interleaved ribs or vanes are included for directing fluid from the inlet port means to the outlet port means in a continuous, generally directly outward manner. The positioning of the vanes provides a degree of turbulence in such flowing fluid.

6 Claims, 2 Drawing Figures

FLUID-COOLED LASER MIRROR

BACKGROUND OF THE INVENTION

This invention relates to mirrors, and more particularly to fluid-cooled mirrors utilized in laser systems.

Metallic mirrors are commonly used to deflect, focus or change the shape of laser beams for certain applications. The mirrors are subjected to intense heat by the laser beam and are frequently liquid-cooled in an attempt to prevent distortion thereof due to differential temperatures. One such mirror is disclosed in U.S. Pat. No. 3,637,296 to McLafferty et al. However, the disadvantage of that mirror structure is that the coolant thereof enters a manifold on one side of the mirror and flows through parallel passages to a diametrically opposite outlet manifold. As the coolant flows through the passages, it takes on heat from the mirror surface and, since the coolant on the outlet side of the mirror is hotter than the coolant entering on the inlet side, the outlet half of the mirror will not be cooled as effectively as the inlet half. Such differential cooling could cause slight distortion of the mirror surface and undesirable distortion of the laser beam.

Another liquid-cooled mirror structure is disclosed in U.S. Pat. No. 3,731,992 to Mansell, wherein a coolant flows through a plurality of spiral grooves which converge at a central outlet manifold. A disadvantage of that structure, is that the spiral passages create relatively long flow paths for the coolant. Since the coolant takes on heat from the mirror surface as it flows through the passages, the mirror surface adjacent to the outlet manifold is not cooled as much as the mirror surface adjacent to the inlet passage at the periphery. Thus, relatively high coolant flow rates would be required to assure adequate cooling at the central portion of the mirror.

Of more general interest in this area is U.S. Pat. No. 3,781,094 to Griest.

SUMMARY OF THE INVENTION

It is accordingly an object of this invention to provide a fluid-cooled laser mirror which overcomes the problems of the prior art set forth above by providing generally uniform, effective and efficient cooling of the mirror surface thereof, meanwhile being highly reliable in operation and economical for production.

Broadly stated, the invention is in a mirror apparatus, and comprises body means defining a reflective surface, the body means defining first port means adjacent the center thereof and second port means adjacent the outer peripheral edge thereof. Further included are means defined by the body means and associated with the first and second port means whereby a fluid can continuously flow through one of the first and second port means generally directly to, and from, the other of the first and second port means.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
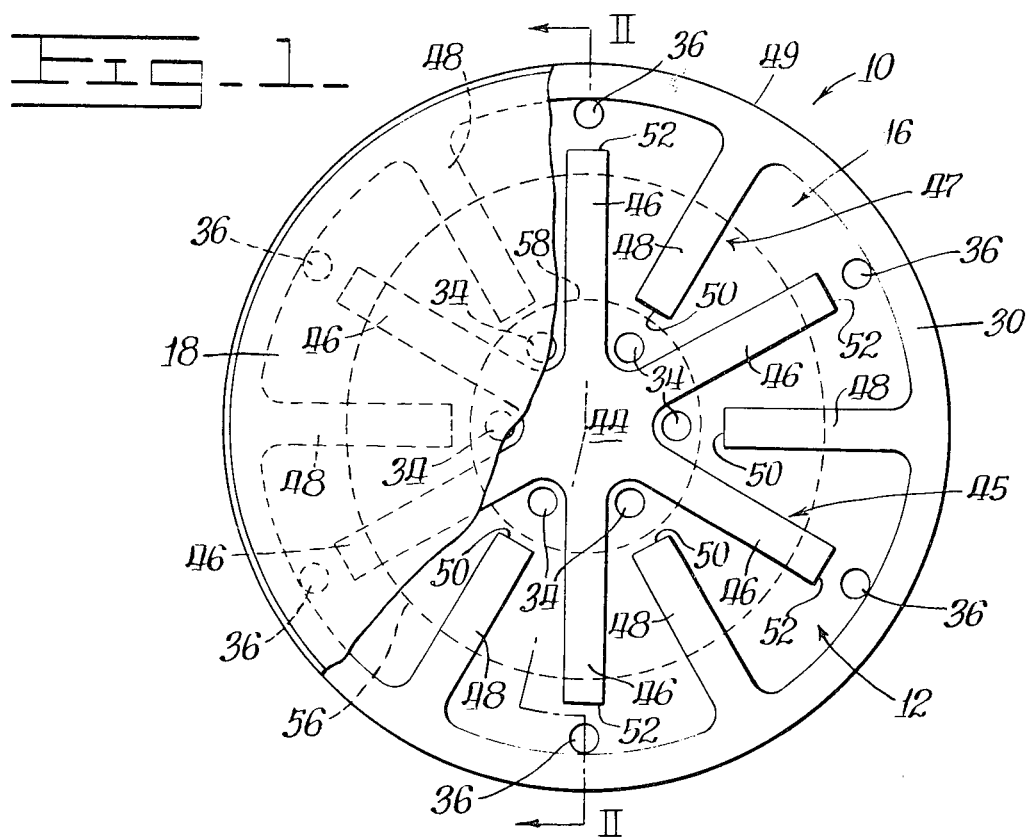
FIG. 1 is a plan view of the fluid-cooled mirror of the present invention, with a portion thereof broken away.

As shown in the drawing, a mirror apparatus is generally indicated at 10. Such mirror apparatus 10 is made up of a body 12 which is in turn made up of an annular base plate 14 secured to a rearward axial end of an annular body member 16, and an annular cover 18 secured to a forward axial end of the member 16. The cover has a reflective mirror surface 20 on the outer side thereof, and is made of any suitable polished metal such as copper. A central inlet passage 22, extends through the base plate 14 and communicates with an annular manifold 24 in the base plate 14 adjacent the rearward end of the member 16 and adjacent the center of the body 12. A conduit 26 connects the inlet passage to a suitable source of liquid, not shown.

The member 16 defines a member surface 28 spaced from the cover 18, and a circular outer wall 30 to which the cover 18 is secured. The member 16, outer wall 30 and cover 18 define a chamber 32, the outer portion of the chamber being defined by the outer wall 30. The member 16 defines six inlet ports 34 providing communication between the chamber 32 and inlet manifold 24, and six outlet ports 36 providing communication between the chamber 32 and outlet conduits 38 which in turn connect to a common coolant return conduit 40 which communicates with a coolant reserve, not shown, through a manually operated control valve 42.

The member defines a central hub 44, a first plurality of vanes 45, and a second plurality of vanes 47 within the chamber 32 and in contact with the cover 18 which has its centermost region secured to the hub to prevent distortions of the mirror surface 20 due to fluid passage. The plurality of vanes 45 is made up of six vanes 46 substantially equally spaced, and extending radially from the central hub 44, toward the outer peripheral edge 49 of the body 12. The inlet ports 34 are disposed adjacent the center of the body 12, each inlet port 34 being positioned between an adjacent pair of vanes 46.

The second plurality of vanes 47 is made up of six vanes 48, each equally spaced and extending from the outer wall 30 adjacent the outer peripheral edge 49 of the body 12 toward the center of the body 12. The vanes 48 are positioned substantially radially. Each of the vanes 48 extends between an adjacent pair of vanes 46, and is substantially midway therebetween.

Each outlet port 36 is positioned adjacent the outer wall 30 substantially midway between a pair of adjacent vanes 46. Each of the vanes 48 extends toward the center, terminating in an extended end portion 50 substantially radially outwardly from but adjacent to an inlet port 34. Each of the vanes 46 extends toward the peripheral edge 49, terminating in an extended end portion 52 spaced from the outer wall 30 and substantially radially inward from but adjacent to an outlet port 36.

Figure 2:
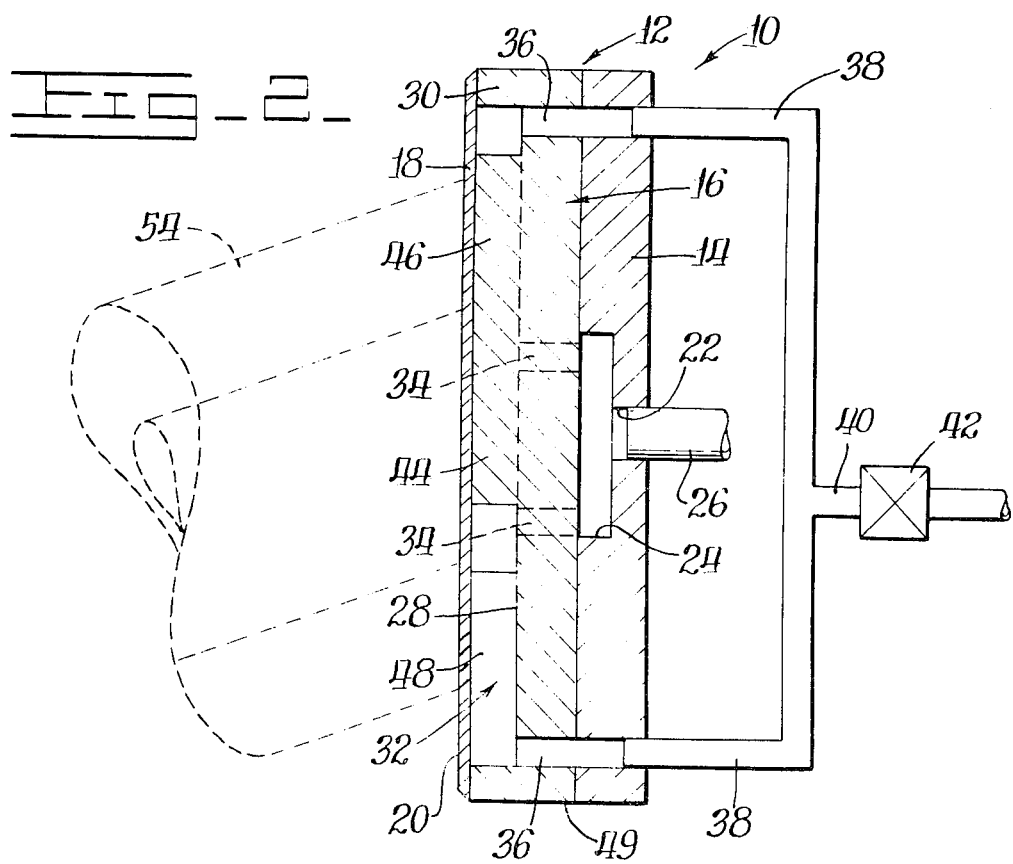
FIG. 2 is a sectional view taken along the line II—II of FIG. 1.

In operation, a laser beam having an annular cross section as indicated at 54 in FIG. 2 strikes the reflective mirror surface 20 of the cover 18 at a slight angle and is reflected therefrom in the usual manner. The area of the reflective surface 20 subjected to the beam 54 is shown by the broken line eliptical shaped rings 56, 58 as shown in FIG. 1. Liquid coolant enters the manifold 24 through the conduit 26 and inlet passage 22 and passes through the inlet ports 34 and into the chamber 32. The coolant flowing through each of the inlet ports 34 is split by the associated vane 46 such that substantially equal volumes of coolant flow between the vane 48 and adjacent vanes 46 into respective cavities defined by pairs of adjacent vanes 46,48. In addition to splitting the liquid flow, the vanes 48 create a turbulence in the flow for more efficient heat transfer from the reflective mirror surface 20 of the cover 18 to the coolant.

Through the particular palcement of the vanes and inlet and outlet ports, the liquid coolant can continuously flow through the inlet ports 34 and will move generally directly outwardly from adjacent the center of the body 12 to adjacent the outer peripheral edge 49. After cooling the reflective mirror surface 20, the liquid coolant is exhausted from the chamber 32 through the outlet ports 36, the conduits 38,40, and the control valve 42 to the reservoir. As mentioned, the vanes 48 provide a degree of turbulence in the liquid flowing in such generally directly outward manner, for more efficient heat transfer from the reflective mirror surface 20 of the cover 18 to the coolant.

The coolant flow rate through the apparatus 10 is controlled by the control valve 42 arranged on the outward side, thereby assuring that the chamber 32 is always filled with coolant, and to prevent the formation of air pockets which would cause hot spots in the cover 18.

What is claimed is:

1. A mirror apparatus comprising: body means defining a mirror surface; said body means defining first port means adjacent the center thereof and second port means generally outward of the first portion means and adjacent the outer peripheral edge of said body means; and means defined by the body means and associated with the first and second port means whereby a fluid can continuously flow through one of said first and second port means, generally directly to, and from, the other of said first and second port means, wherein the means defined by the body means further comprise means for providing a degree of turbulence in a fluid flowing generally directly to, and from, the other of said first and second port means, wherein the means defined by the body means comprise a chamber defined by the body means and interconnecting the first and second port means, and through which a fluid may flow, a first plurality of spaced vanes defined by the body means within said chamber and extending from adjacent said center toward the outer peripheral edge, and a second plurality of spaced vanes defined by the body means within said chamber and extending from adjacent the outer peripheral edge toward said center, each of said second vanes extending between an adjacent pair of first vanes.

2. The apparatus of claim 1 wherein the first port means comprise inlet port means, the second port means comprise outlet port means, and whereby a fluid can continuously flow through said inlet port means, generally directly outwardly from adjacent said center to adjacent said outer peripheral edge and from the outlet port means.

3. The apparatus of claim 2 wherein each of the first plurality of vanes extends from adjacent the center in a substantially radial manner, and wherein the inlet port means comprise a plurality of individual inlet ports, each positioned adjacent the center and between a pair of adjacent first vanes, and wherein each of the said second plurality of vanes extends toward the center terminating in an extended end portion substantially radially outwardly from but adjacent to an inlet port.

4. The apparatus of claim 3 wherein the body means further comprise a circular outer wall defining the outer portion of said chamber, each of the second vanes extending from said outer wall toward said center, and wherein the outlet port means comprise a plurality of individual outlet ports, each being positioned adjacent said outer wall between a pair of adjacent second vanes.

5. The apparatus of claim 4 wherein each of said first vanes extends toward the peripheral edge terminating in an extended end portion spaced from said outer wall and substantially radially inward from but adjacent to an outlet port.

6. The apparatus of claim 5 wherein the first plurality of vanes comprise six vanes, substantially equally spaced, and the second plurality of vanes comprise six vanes, each extending substantially radially inwardly toward said center, and substantially equally spaced.

* * * * *